United States Patent
Biacs et al.

(10) Patent No.: US 7,522,588 B2
(45) Date of Patent: Apr. 21, 2009

(54) SYSTEM AND METHOD FOR REFERENCE DATA PROCESSING IN NETWORK ASSISTED POSITION DETERMINATION

(75) Inventors: Zoltan Biacs, San Mateo, CA (US); Mark Moeglein, Ashland, OR (US); Justin McGloin, Mountain View, CA (US)

(73) Assignee: QUALCOMM Incorporated, San Digeo, CA (US)

( * ) Notice: Subject to any disclaimer, the term of this patent is extended or adjusted under 35 U.S.C. 154(b) by 699 days.

(21) Appl. No.: 10/318,448

(22) Filed: Dec. 13, 2002

(65) Prior Publication Data

US 2003/0210656 A1 Nov. 13, 2003

Related U.S. Application Data

(60) Provisional application No. 60/380,405, filed on May 13, 2002.

(51) Int. Cl.
*H04L 12/28* (2006.01)
(52) U.S. Cl. ........................ 370/389; 370/316; 370/401
(58) Field of Classification Search ................ 701/207, 701/209, 213, 214, 215; 342/450, 357.01–357.15; 455/456.1, 517; 370/401, 389, 316, 313
See application file for complete search history.

(56) References Cited

U.S. PATENT DOCUMENTS

| | | | | |
|---|---|---|---|---|
| 5,477,458 A | * | 12/1995 | Loomis | 701/215 |
| 5,621,646 A | | 4/1997 | Enge et al. | 701/120 |
| 5,796,717 A | * | 8/1998 | Shinbashi et al. | 370/216 |
| 6,067,484 A | * | 5/2000 | Rowson et al. | 701/16 |
| 6,097,699 A | * | 8/2000 | Chen et al. | 370/231 |
| 6,215,441 B1 | * | 4/2001 | Moeglein et al. | 342/357.01 |
| 6,229,478 B1 | | 5/2001 | Biacs et al. | 342/357.03 |
| 6,311,127 B1 | * | 10/2001 | Stratton et al. | 701/213 |
| 6,324,473 B1 | | 11/2001 | Eschenbach | 701/215 |
| 6,411,254 B1 | * | 6/2002 | Moeglein et al. | 342/357.01 |
| 2002/0024461 A1 | * | 2/2002 | Moeglein et al. | 342/357.1 |
| 2003/0056138 A1 | * | 3/2003 | Ren | 714/4 |

FOREIGN PATENT DOCUMENTS

CN 1307683 8/2001

OTHER PUBLICATIONS

Douglas Corner, Internetworking with TCP/IP Principles, Protocols, and Architectures, Fourth Edition, Prentice Hall, dated 1995 pp. 19 & 37.*
Douglas E. Comer, Internetworking with TCP/IP Principles, Protocols, and Architectures, 4th Edition, Prentice Hall, 1995, pp. 19 & 37.
International Preliminary Examination Report, PCT/US03/15200, May 13, 2003, 12 pages.
International Search Report, PCT/US03/15200, Sep. 30, 2003, 3 pages.

* cited by examiner

*Primary Examiner*—Robert W Wilson
(74) *Attorney, Agent, or Firm*—Bruce Greenhaus; Linda G. Gunderson

(57) ABSTRACT

A system and method of preprocessing reference data in a reference assisted location technology are disclosed. A plurality of reference stations each provides reference data over a network to a preprocessing. The preprocessor analyzes the data from the multiple reference stations and eliminates multiples sets of redundant data. In addition, the preprocessor can perform quality assurance checks on the data as well as the status of the reference stations themselves. Non-redundant data may also be preprocessed to perform differential GPS calculations. The preprocessed data is transmitted to one or more position servers for additional processing and position determination.

17 Claims, 7 Drawing Sheets

SYSTEM AND METHOD FOR REFERENCE DATA PROCESSING IN NETWORK ASSISTED POSITION DETERMINATION

RELATED APPLICATIONS

This application claims priority to U.S. Provisional Application No. 60/380,405, filed on May 13, 2002.

BACKGROUND

1. Technical Field

The present invention relates generally to position determination and, in particular, concerns server-assisted position determination technology.

2. Description of the Related Art

Satellite position systems (SPS) determine the location of a receiver based on signals received from a plurality of satellites. In one example of an SPS, known as a Global Positioning System (GPS), receivers normally determine their position by computing relative times of arrival of signals transmitted simultaneously from a multiplicity of GPS satellites. These satellites transmit, as part of their message, both satellite positioning data as well as data on clock timing, so-called "ephemeris" data. The process of searching for and acquiring GPS signals, reading the ephemeris and GPS system data (ionospheric data, universal time coordinated (UTC) data, almanac data, health data) for a multiplicity of satellites is time consuming. In many cases, this lengthy processing time is unacceptable and, furthermore, greatly limits battery life in micro-miniaturized portable applications.

Another limitation of current GPS receivers is that successful operation is limited to situations in which multiple satellites are clearly in view, i.e., without obstructions, and a good quality antenna is properly positioned to receive such signals. As such, current GPS receivers normally are unusable in portable body-mounted applications in areas where there is significant foliage or building blockage (e.g., urban canyons), and in-building applications.

One known solution to this problem involves the use of a wireless telephone integrated with a GPS receiver. The term "wireless telephone" includes, but is not limited to, cellular telephones, personal communication systems (PCS) devices, analog wireless telephones, digital wireless telephones, and the like. Although examples may be provided of specific types of wireless telephones, the present invention is not limited to any specific form of wireless communication device. A wireless link is established between the mobile GPS unit, or client, and a server, which is sometimes referred to as a position determining entity (PDE). The mobile GPS receiver takes what is referred to as a snapshot of the available satellite signals. That is to say, the mobile GPS receiver records a short duration of signals from as many satellites as are available in its line of sight. As described above, obstructions often limit the number of satellites that can be detected by the mobile GPS receiver and may also degrade the quality of the signals received by the mobile GPS receiver. In the presence of such obstructions, the received satellite signals are likely to be attenuated and fragmented, due to the location of the mobile GPS receiver, which may be in close proximity to buildings or foliage, etc.

There are known techniques for using an SPS, such as GPS with a reference network. A plurality of reference receivers forward received GPS data to a central location, such as the PDE. The PDE also receives data from the mobile GPS receiver and analyzes the mobile GPS data with respect to GPS data from the reference receivers. As a result of this analysis, the PDE is able to determine the location of the mobile GPS receiver.

FIG. 1 is a functional block diagram illustrating existing technologies for wireless assisted location technologies. The system 10 comprises a plurality of reference stations 12-16 that include the necessary hardware to receive GPS satellite signals and transmit the received data via a communication link 18. In a typical implementation, the communication link 18 is a wide area network (WAN). A communication controller 20 receives the reference data and may multiplex the data for convenience in subsequent transmission. The communication controller 20 receives the various forms of reference data from the reference stations 12-16 and transmits the reference data to a position determining entity (PDE) 22 via a communication link 24. In a typical implementation, the communication link 18 is a WAN.

The reference stations 12-16, the communication link 18, and the communication controller 20 may be described as a wide area reference network (WARN) 26. In a typical implementation of the WARN 26, the reference stations 12-16 are widely distributed throughout a region in precisely known locations. FIG. 1 illustrates reference stations 1-N where N may vary based on the area of coverage. For example, the continental United States may have a dozen or more reference stations distributed throughout the country.

Although not illustrated in FIG. 1, each of the reference stations 12-16 includes an antenna, a GPS receiver, and network interface equipment. In general, the reference stations 12-16 comprise survey grade GPS receivers that are capable of transmitting and receiving messages through communication ports, such as an RS-232 serial port. One example of a GPS receiver capable of operating as a reference receiver (e.g., in the reference stations 12-16) is the NovAtel receiver, which generates both pseudorange and Doppler measurement data. This data, which is sometimes referred to as measurement output data, is supplied by virtually all commercial GPS receivers. In addition, some receivers, such as the NovAtel receiver, are also capable of generating GPS navigation message output data, in raw and/or pre-processed forms. Such receivers are commercially available and need not be described in greater detail herein.

The various reference stations 12-16 forward reference data to the PDE 22. The reference data includes such data as pseudorange and Doppler data from single-frequency or dual-frequency reference stations, raw GPS navigation message output data, and a one-pulse-per-second signal for time synchronization. In some circumstances, the reference stations 1216 may not support all of the reference data described above. However, the reference data described above are illustrative of typical reference data from the reference stations 12-16.

Also illustrated in FIG. 1 is a mobile GPS unit 30, which may typically be embodied in a combination wireless communication device (e.g., a cellular telephone or PCS device) combined with a GPS receiver. As noted above, the mobile GPS unit 30 generally does not receive satellite data of sufficient quantity and quality to enable independent accurate determination of the location of the mobile GPS unit 30. Instead of an independent position determination, the mobile GPS unit 30 transmits the fragmentary GPS data that it has received to a wireless communication controller 32. The wireless communication controller 32 may be a conventional base transceiver station (BTS) or the like. The wireless communication controller 32 transmits the fragmentary measurement data to the PDE 22 via a communication link 34. In a typical implementation, the communication link 34 may be a WAN.

The PDE 22 analyzes the GPS measurements (code phase and/or other measurements) data from the mobile GPS unit 30 with respect to the reference data provided by the WARN 26. For example, in one implementation, fragmented data samples from a quadrature receiver (i.e., I/Q data samples) are used to "pattern match" with a GPS navigation message data from reference stations (e.g., the reference stations 12-16). The concept of pattern matching signals from a GPS receiver with GPS signals from a reference station is known in the art and need not be described in greater detail herein. The PDE 22 can then use these time-stamped measurements, using known methods, to accurately determine the location of the mobile GPS unit 30. The PDE 22 may transmit the position data back to the mobile GPS unit 30 via the wireless communication controller 32. The process of position determination using a reference network is well known and need not be described in greater detail herein.

In operation, the raw data measurements and navigation message from each of the reference stations 12-16 in the WARN 26 is forwarded to the PDE 22 for processing with data received from the mobile GPS unit 30. On the basis of the complete (or nearly complete) reference data from the plurality of reference stations 12-16 and the data from the mobile GPS unit 30, the PDE 22 can determine the location of the mobile unit with a high degree of accuracy.

The difficulty with such an approach is the additional data load on the PDE 22. Therefore, it can be appreciated that there is a significant need for an apparatus and method that will efficiently determine the location of a mobile GPS unit based on reference data from the WARN. The present invention provides this, and other advantages, as will be apparent from the following detailed description and accompanying figures.

SUMMARY

The presently disclosed system and method preprocesses reference data in a reference assisted position location system. In one implementation, an apparatus is used for processing reference data for wireless assisted positioning using data received from a plurality of reference data sources. A preprocessor receives reference data from the plurality of reference data sources. The reference data is preprocessed. A position determining processor (PDP) is coupled to the preprocessor to calculate the position of a mobile unit based at least in part on the preprocessed data.

In one embodiment, the preprocessor filters the reference data to remove redundant data received from the plurality of reference data sources. In another embodiment, the preprocessor analyzes the reference data to remove unreliable reference data received from the plurality of reference data sources.

In one embodiment, the plurality of reference data sources are associated with a first network and the PDP is associated with a second network. One such embodiment further comprises a router associated with the second network to receive data from the first network.

In one embodiment, the preprocessor is associated with the second network. The router associated with the second network receives the reference data from the plurality of reference data sources associated with the first network.

In an alternative embodiment, the preprocessor is associated with the first network. The router associated with the second network receives the processed data from the first network. In yet another alternative embodiment, multiple preprocessors are associated with either the first or second networks in a distributed system.

DETAILED DESCRIPTION OF THE EMBODIMENTS

In conventional systems, the Position Determination Entity (PDE) 22 must process a significant amount of reference data from the Wide Area Reference Network (WARN) 26 to determine the location of the mobile Global Positioning System (GPS) unit 30. The present techniques include a preprocessor that analyzes data from the WARN 26 prior to processing by the PDE 22. As a result of this preprocessing, the workload of the PDE 22 is greatly reduced and the throughput of the position determining technology thereby enhanced.

Figure 2:
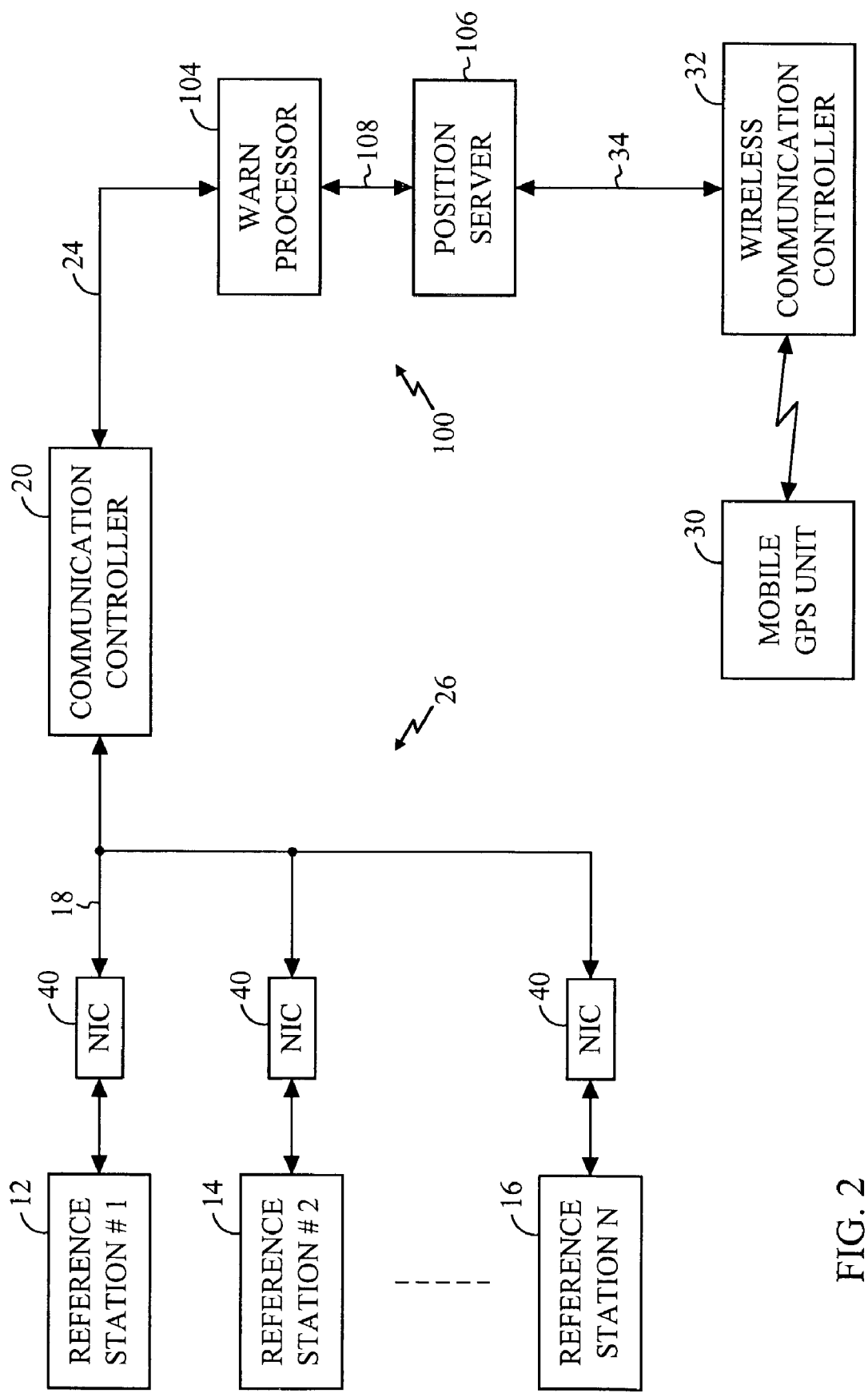
FIG. 2 is a functional block diagram of one embodiment of the disclosed method and apparatus.

One system 100 is shown in a simplified form in the functional block diagram of FIG. 2. A plurality of reference stations (e.g., the reference stations 12-16) each generate a set of reference data for transmission to a Communication Controller (CC) (e.g., the communication controller 20) via a communication link 18. For the sake of convenience in describing the system 100, the communication link 18 will be described herein as a wide area network (WAN). However, those skilled in the art will recognize that the communication link 18 may be implemented by other conventional techniques, such as a T1 connection, DSL, ISDN, cable modem, a dedicated line, satellite link, microwave link, LAN or the like. The disclosed architecture is not limited to the specific form of the communication link 18 shown between the reference stations 12-16 and the CC 20.

Associated with each reference station is a network interface function, which comprises a network interface controller (NIC) 40. The function of the NIC 40 is to place the data into a plurality of data packets or frames for transmission over the WAN 18. A number of different interface types may be used to accomplish this task. For example, the NIC 40 may be implemented by a frame relay access device, a serial-to-internet protocol (IP) conversion device or the like. Those skilled in the art will recognize that other network interface devices may also be used satisfactorily with the system 100 depending on the specific implementations of the communication link. The operation of these devices is known in the art and need not be described in greater detail herein.

It should be noted that the NIC 40 only provides a data packeting and addressing function, but does not process the reference data itself. The NIC 40 places the data from each of the reference stations 12-16 onto the WAN 18 for IP routing. In a current implementation of the WARN 26, the CC 20 is coupled to the WAN 18 and receives the data from each of the reference stations 12-16. Although not specifically illustrated in FIG. 2, those skilled in the art will appreciate that the CC 20 also includes a network interface function, such as the NIC 40. If the communication link 18 is implemented as a WAN, the network interface function associated with the CC 20 may comprise a router. The operation of such devices is well known in the art and, for the sake of brevity, will not be described herein.

The WARN 26 may include one or more CCs 20. The CC 20 may be readily implemented on different computer operating systems, such as Unix or WinNT. The CC 20 has no knowledge about the specific reference data (i.e., pseudorange, Doppler, navigation data, ephemeris data, and the like), but is used to manage and monitor the state of the data coming through the frame relay. Upon receipt of reference data from one or more of the reference stations 12-16, the CC 20 attaches a header indicating the length of the reference data (e.g., number of bytes), station identification for the reference station (e.g., the reference stations 12-16) that generated the data, and sequence number. The CC 20 then routes the data to a WARN processor 104 using a communication link 24.

For the sake of convenience in describing the system 100, the communication link 24 will be referred to herein as a WAN. However, those skilled in the art will recognize that the communication link 24 may be implemented by other conventional techniques, such as a T1 connection, DSL, ISDN, cable modem dedicated line, satellite link, microwave link, or the like. Other embodiments may use other forms of the communication link 24.

In operation, the CC 20 places each data packet on the WAN 24 for Internet Protocol (IP) routing. The CC 20 functions to multiplex raw data and feed the raw data over the communication link 24 to the WARN processor 104 for preprocessing. As will be described in greater detail below, the WARN processor 104 routes the preprocessed data to a position determining processor (PDP), which is referred to herein as a position server 106. In FIG. 2, the WARN processor 104 is coupled to the position server 106 by a communication link 108. For the sake of convenience in describing the system 100, the communication link 108 will be described herein as a local area network (LAN). However, those skilled in the art will appreciate that the communication link 108 may be satisfactorily implemented in the system 100 by other conventional techniques, such as a T1 connection, DSL, ISDN, cable modem, dedicated line, satellite link, microwave link, WAN or any other communications link suitable for such communicating.

Figure 3:
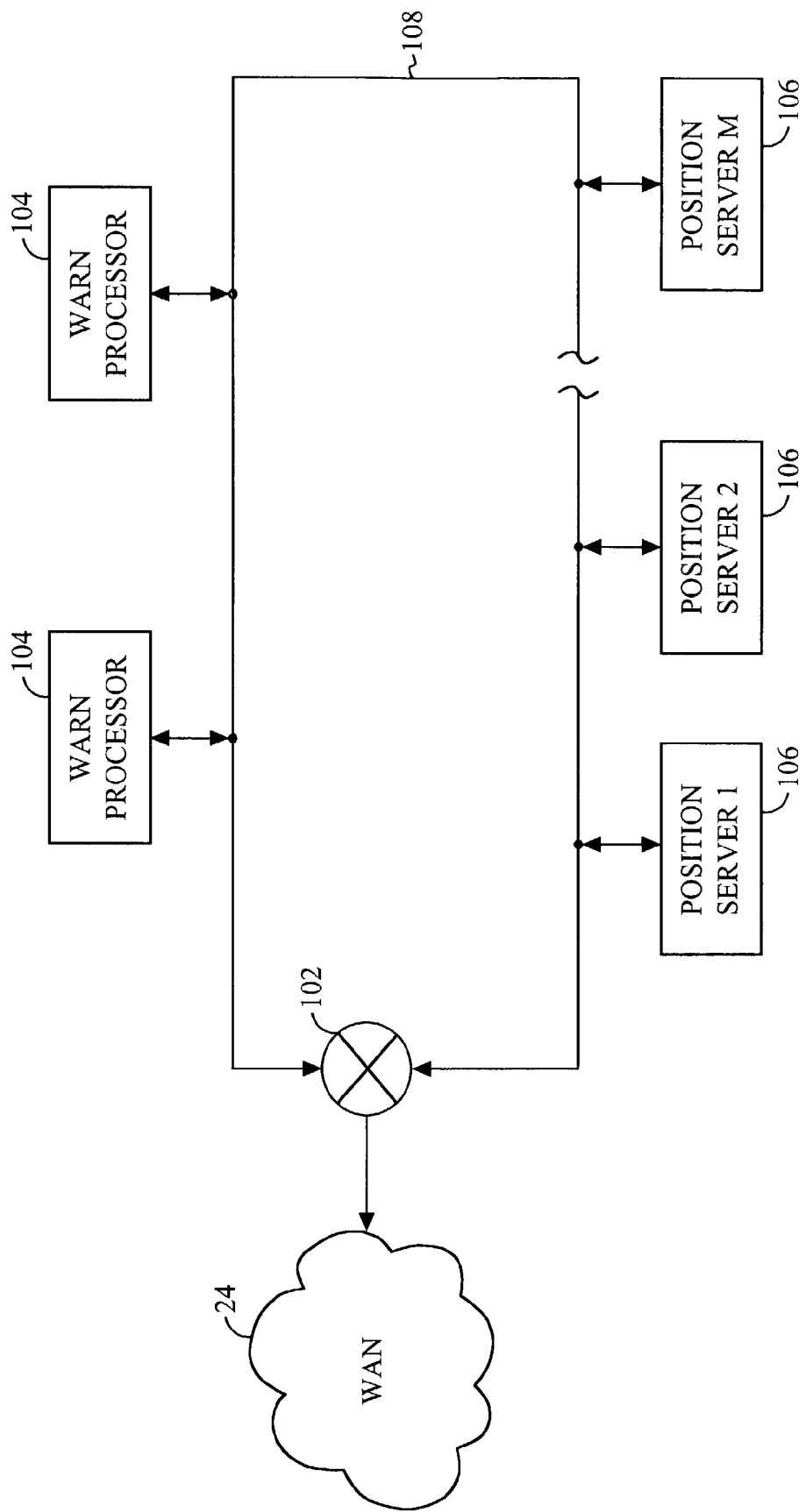
FIG. 3 is a functional block diagram of an alternative embodiment.

In one embodiment, the system 100 is implemented in a distributed architecture with a plurality of WARN processors 104 to perform the preprocessing of reference data and/or a plurality of position servers 106 to make the necessary position calculations. In this distributed architecture, illustrated in FIG. 3, the system 100 is implemented using a plurality of position servers 106, each of which may operate independently to calculate the position of the mobile GPS unit 30 (see FIG. 2). In this embodiment, the system 100 may be implemented as a client-server architecture in which the WARN processor 104 functions as a client and provides data to a selected one of the position servers 106. In turn, the selected position server 106 performs the necessary position calculations and returns the desired result.

In a typical implementation, the number of position servers 106 depends on the number of customers requiring position determining technology (i.e., more position servers 106 may be added to the system 100 as the number of customers increases). The position servers 106 may be centrally located or geographically distributed. In a typical implementation, one or more position servers 106 are associated with one or more WARN processors 104. In this case, a single position server 106 would receive data from one of the WARN processors 104 and perform the necessary position determining calculations. However, in other implementations, the workload between the WARN processors 104 and the position servers 106 may be dynamically balanced for greatest data throughput. Techniques for load balancing among multiple processors (i.e., multiple WARN processors 104 and/or multiple position servers 106) in a distributed architecture are well known in the art and need not be described in greater detail herein. However, the multiple WARN processors 104 and multiple position servers 106 function to provide the necessary position location data in an optimized fashion. As will be described in greater detail below, multiple WARN processors 104 may also operate in a redundant configuration to provide failure mode recovery in a distributed architecture.

The one or more WARN processors 104 communicate with the plurality of position servers 106 via the communication link 108. In one embodiment, the WARN processor 104 may be implemented on the same computing platform as a corresponding position server 106. In this embodiment, the communication link 108 may be an internal data bus within a computing platform.

In an alternative embodiment, the WARN processors 104 and position servers 106 may be implemented on different computing platforms. In this embodiment, the communication link 108 may be a network link, such as a LAN. Those skilled in the art will recognize that other architectures may be readily employed to implement the system 100.

Figure 1:
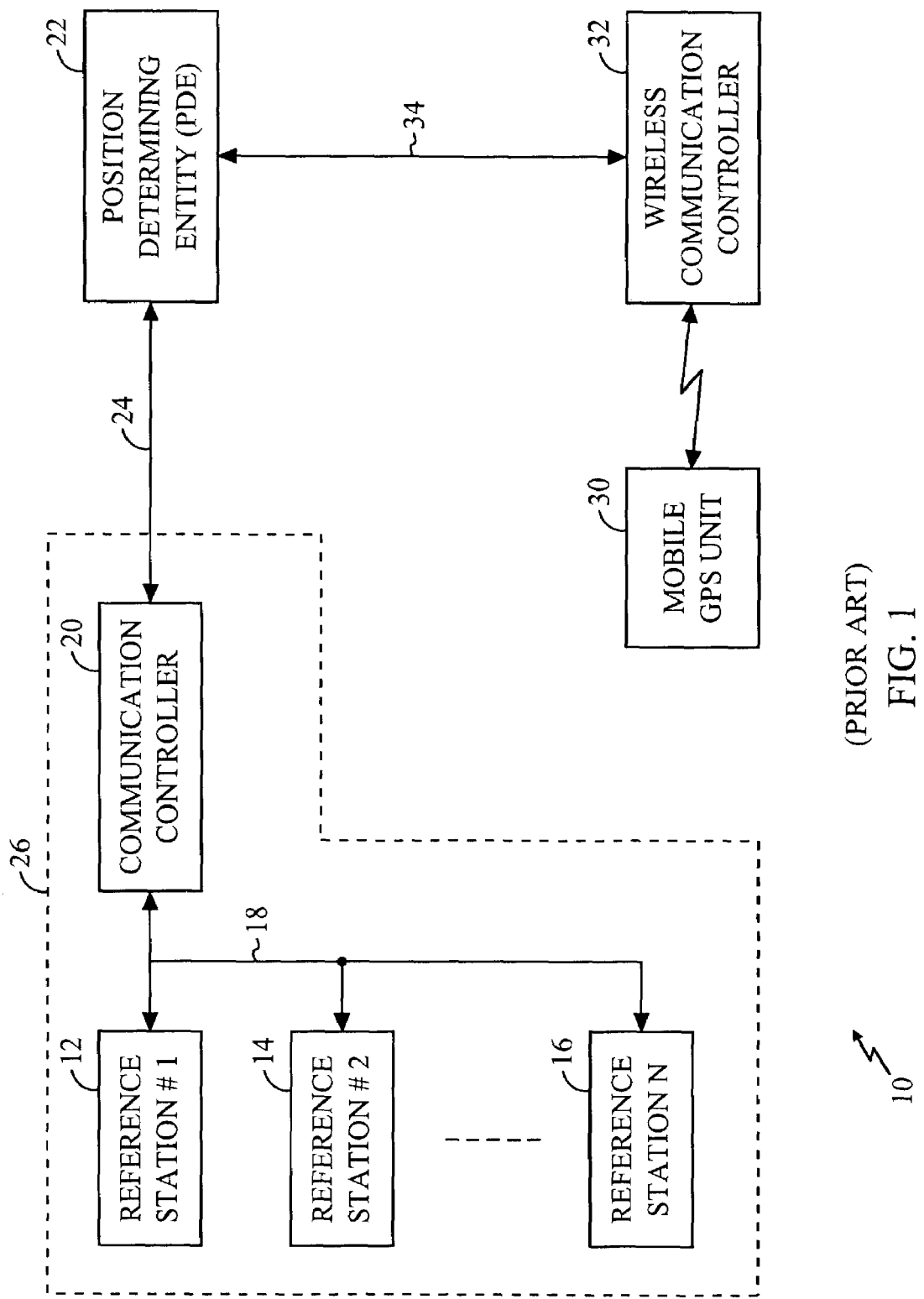
FIG. 1 is a functional block diagram of a conventional reference assisted wireless location system.

In yet another alternative embodiment, the position server 106 does not perform the actual position determining calculations. Instead, the position server 106 receives the preprocess reference data from the WARN processor 104 and performs calculations to generate "aiding" information, such as ephemeris data and/or almanac data. The position server 106 forwards the aiding information to a separate position determining entity. In one embodiment, the position determining entity 22 may be co-located with the mobile GPS unit 30 (see FIG. 1). In this embodiment, the necessary data is forwarded to the mobile GPS unit 30 so that the unit 30 may perform calculations to determine its own position. In other embodiments, a separate independent position determining entity 22 may perform the necessary calculations and forward the results to the mobile GPS unit 30. The various components of the system 100 are coupled to WANs (e.g., the communication link 18 and the communication link 24) using routers 102. Routers are conventional computer system components whose operation is well understood and need not be described in greater detail herein.

If other forms of communication, such as an ISDN connection, are used to implement either the communication link 18 or the communication link 24, the routers 102 may be replaced with other conventional computer components appropriate for the specific architecture. The specific location of the WARN processor 104 is not critical to satisfactory operation of the system 100.

Figure 4:
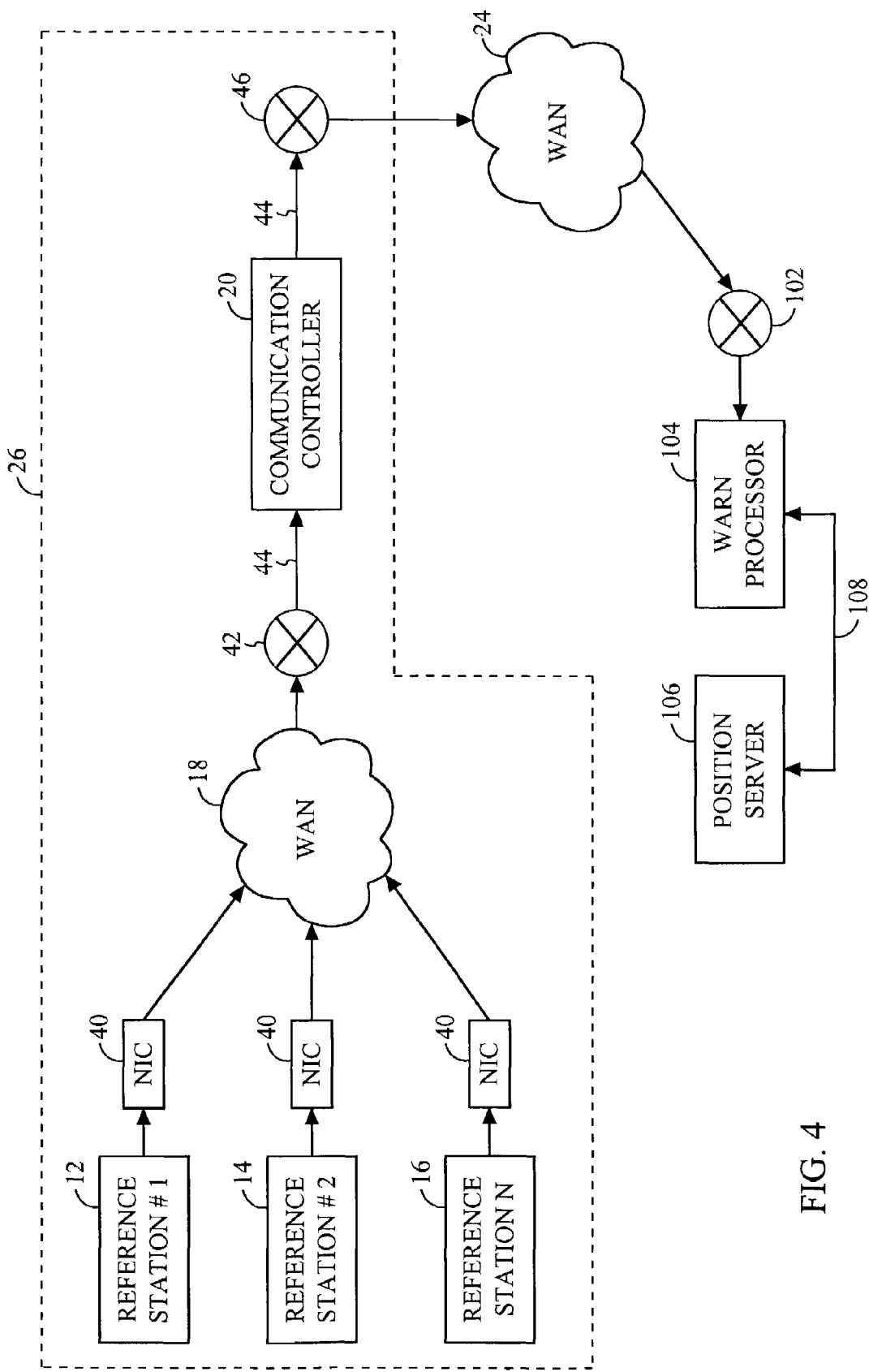
FIG. 4 is a functional block diagram illustrating an example architecture of the disclosed method and apparatus.

FIG. 4 is a functional block diagram illustrating an implementation of the system 100 with an existing WARN 26. As previously discussed, the reference stations 12-16 are each coupled to the WAN 18 using the NIC 40 to format and address the data to the CC 20. A router 42 is coupled to the WAN 18 and receives the reference data from the reference stations 12-16. The router 42 is a conventional component and operates to receive the reference data addressed to the router and to relay the reference data to the CC 20. The router 42 and CC 20 are coupled by a communication link 44, which may be implemented in a variety of known fashions. In one implementation, the communication link 44 is a LAN. The system 100 is not limited by the specific form in which the communication link 44 is implemented.

The received reference data is further packetized and may be multiplexed by the CC 20 in the manner described above. The packetized data is transmitted to a communication link (e.g., a WAN 24) using a router 46. The operation of the router 46 is known in the art and need not be described in greater detail herein.

The router 102 is coupled to the communication link 24. The router 46 receives the reference data and routes the received reference data to the WARN processor 104 via communication link 108. Thus, in the implementation illustrated in FIG. 4, the WARN processor 104 and the position server 106 are both coupled to the communication link 108. For the sake of convenience, FIG. 4 illustrates the router 102, WARN processor 104 and position server 106 in a single block diagram. However, those skilled in the art will appreciate that these components need not be physically co-located. Using conventional network technology, the various components may be positioned at convenient locations for communication, system maintenance, and the like.

In an alternative embodiment, the WARN processor 104 is coupled to the communication link 44 rather than the communication link 108. This is illustrated in the functional block diagram of FIG. 5. The WARN processor 104 is coupled to the communication link 30 and receives the reference data from the various reference stations (e.g., the reference stations 12-16). The WARN processor 104 performs the same preprocessing functions as does the WARN processor in the embodiment of FIG. 4. However, in this embodiment, the router 46 transmits the preprocessed reference data to the router 102 via the communication link 24. In turn, the router 102 transmits the preprocessed reference data directly to the position server 106 using the communication link 108. Thus, the specific location of the WARN processor 104 is not critical to satisfactory operation of the system 100.

Figure 5:
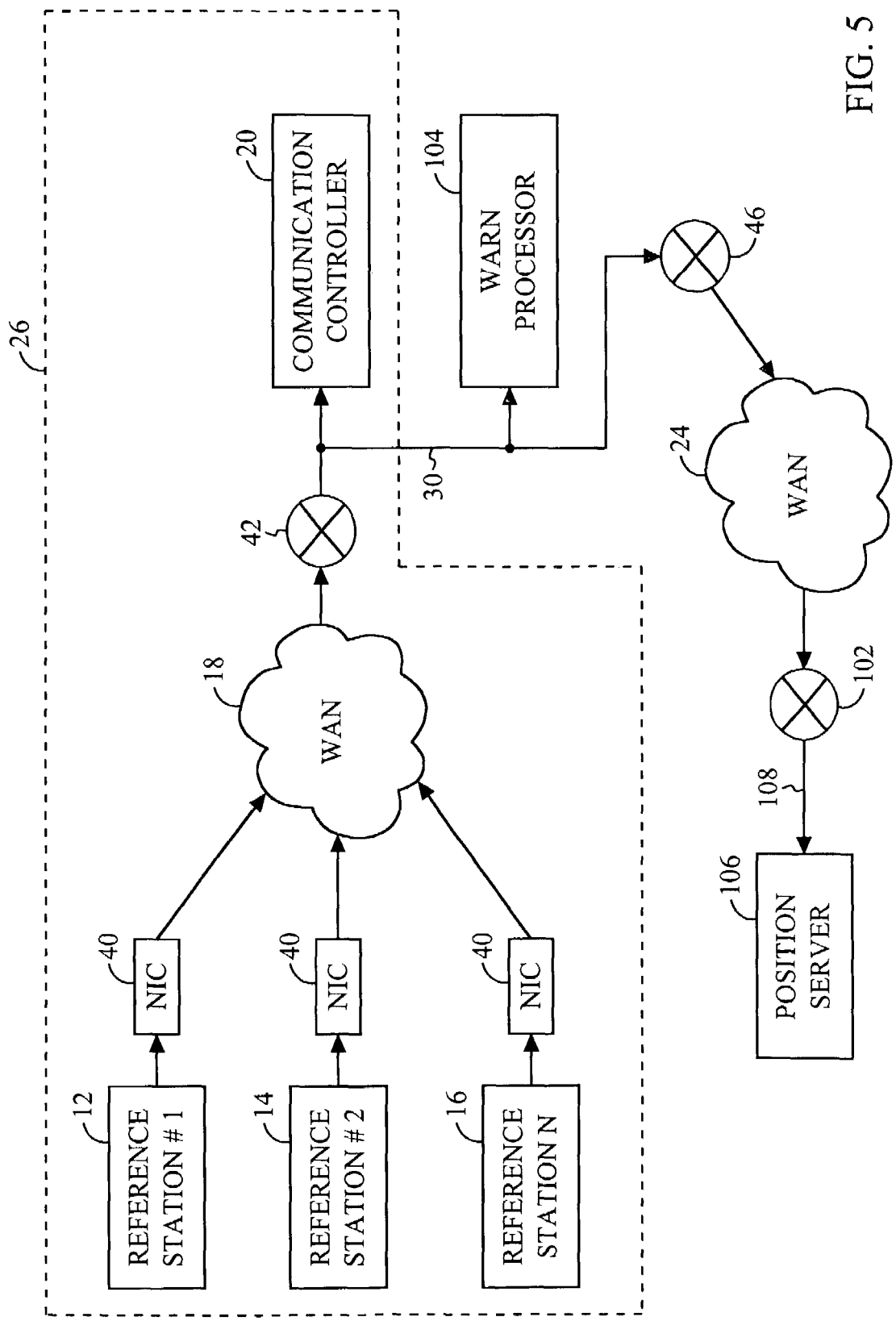
FIG. 5 is a functional block diagram illustrating an alternative architecture.

In the embodiment of FIG. 4 and the embodiment of FIG. 5, the WARN processor 104 performs the same function. That is, the WARN processor 104 preprocesses reference data so as to eliminate extra data processing steps by the position server 106. In the embodiment illustrated in FIG. 4, the router 42 forwards the unprocessed reference data to the WARN processor 104 via the communication link 24 and the router 102. In the embodiment illustrated in FIG. 5, the router 42 routes the unprocessed reference data to the WARN processor 104 for preprocessing. The router 46 subsequently routes the processed data to the position server 106 via the communication link 24 and the router 102.

In yet another alternative embodiment, the distributed architecture of the system 100 permits the association of multiple WARN processors 104. The system architectures of FIGS. 4 and 5 may be combined such that a first WARN processor 104 is coupled to the communication link 108 (see FIG. 4) while a second WARN processor 104 is coupled to the communication link 45 (see FIG. 5) or communication link 31. In this embodiment, workload may be distributed among the two WARN processors 104 to achieve a workload balance. For example, the WARN processor 104 coupled to the communication link 31 may process a first portion of data while the WARN processor 104 coupled to the communication link 108 may process a second portion of data.

Figure 6:
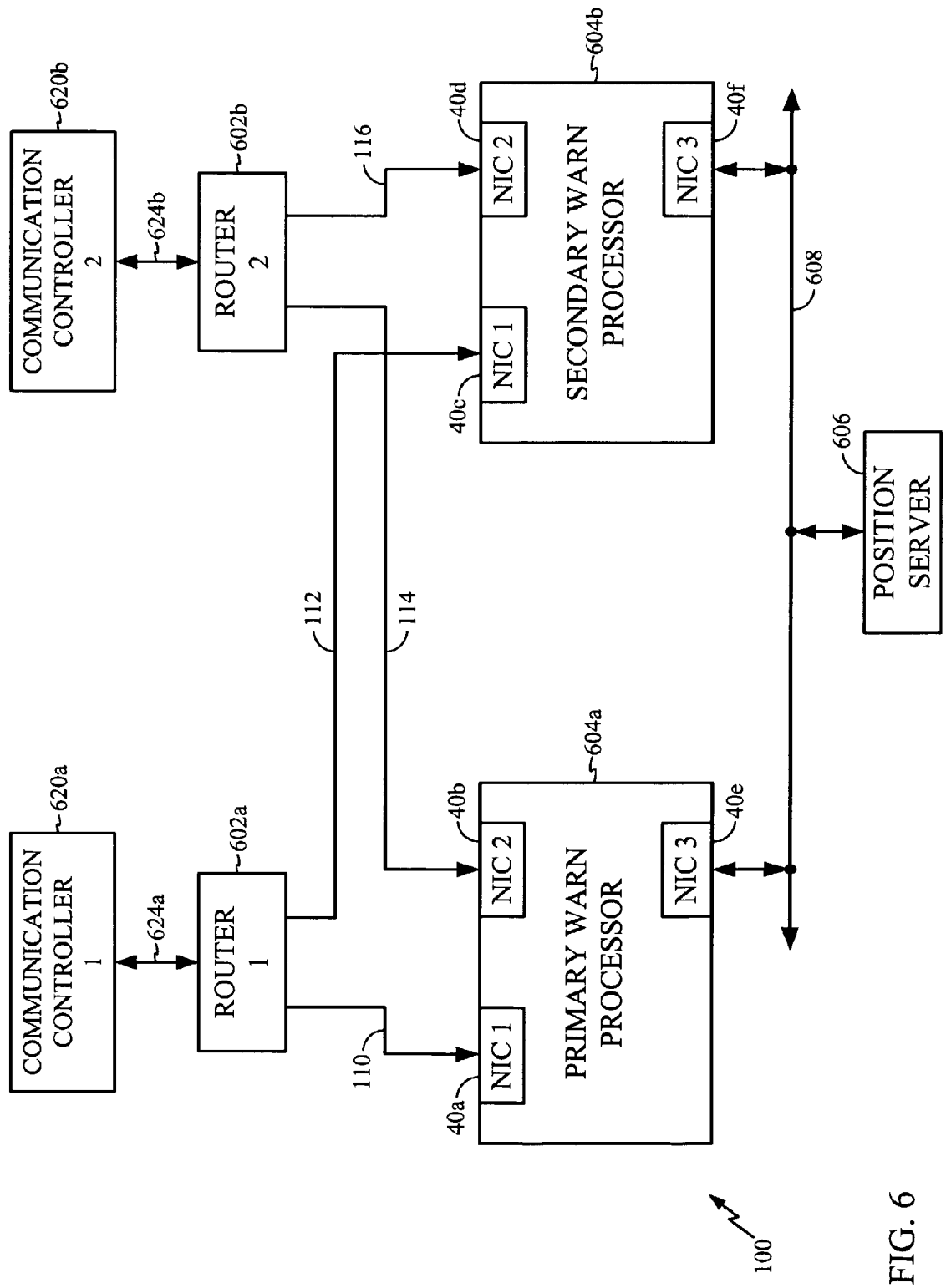
FIG. 6 is a functional block diagram illustrating a redundant architecture.

Alternatively, multiple WARN processors 104 may be implemented in a "daisy-chain" configuration where a first WARN 104 processor coupled to the communication link 45 (see FIG. 5) is configured for pass through operation. That is, the WARN processor 104 coupled to the communication link 31 simply routes the unprocessed data to another WARN processor 104 that may be coupled to the communication link 31 or coupled to the communication link 108 (see FIG. 4). In another alternative embodiment, the WARN processor 104 coupled to the communication link 45 may process data for a first mobile GPS unit 30 (see FIG. 2) while the WARN processor 104 coupled to the communication link 108 processes data associated with a second wireless GPS unit (not shown). In yet another alternative embodiment, one WARN processor 104 may process data from a selected portion of the reference stations 12-16 while the second WARN processor 104 processes reference data from a different portion of the reference stations 12, 14, 16. Additional workload balancing techniques among multiple processors is known in the art and need not be described in greater detail herein. Another advantage of distributed architecture is system redundancy and backup. In this configuration, illustrated in FIG. 6, one WARN processor 604a functions as a primary WARN processor, while a second WARN processor 604b functions as a secondary WARN processor. The primary and secondary WARN processors (collectively referenced as "604") both receive data through independent communication lines. As illustrated in FIG. 6, a first communication controller 620a is coupled to a first router 602a via the communication link 624a, such as a WAN. Similarly, a second communication controller 620b is coupled to a second router 602b via a communication link 624b. Those skilled in the art will recognize that different communication links may be used to couple the communication controllers (collectively referenced as "620") to the routers 602a and 602b. Furthermore, the system 600 illustrated in FIG. 6 may be implemented with only a single communication controller routing data to the primary and secondary WARN processors 604a and 604b, as described below.

As illustrated in FIG. 6, the first router 602a is coupled to the primary WARN processor 604a via a communication link 110. The first router 602a is also coupled to the secondary WARN processor 604b via a communication link 112. Similarly, the second router 602b is coupled to the primary WARN processor 604a via a communication link 114 and is also coupled to the secondary WARN processor 604b via a communication link 116. Those skilled in the art will recognize that the communication links 110-116 may be implemented using a variety of known technologies. For example, the communication links 110-116 may be implemented as LANs, WANs, direct lines, frame relay devices, ISDN communication links, microwave communication links, dedicated lines, wireless communication links, satellite communication links, or a combination of any of the above. The advantage of the independent communication links is that the routers 602 may route data from the communication controllers 620 to either the primary or secondary WARN processor 604. As illustrated in FIG. 6, the primary and secondary WARN processors 604 each comprise a plurality of network interface controllers 40a-40f. The controllers NIC 1, 40a, 40c, in the primary and secondary WARN processors 604 are coupled to the first router 602a via the communication links 110 and 112, respectively. Similarly, the controllers NIC 2, 40b, 40d, in the primary and secondary WARN processors 602 are coupled to router 2, 602b, via the communication links 114 and 116, respectively. In addition, the controllers NIC 3, 40e, 40f, in the primary and secondary WARN processors 604 are coupled to a communication link, such as the communication link 608. The position server 606 is also coupled to the communication link 608 and can receive data from either or both the primary and secondary WARN processors 604. The redundant architecture of FIG. 6 advantageously permits backup operation in the event of a partial system failure. For example, if the first communication controller 620a is inoperable, the second communication controller 620b may route data to both the primary and secondary WARN processors 604 via the second router 602b. Similarly, if a WARN processor 604 fails, the redundant architecture of FIG. 6 allows the system 600 to continue operation. For example, if the primary WARN processor 604a fails, the first and second routers 602 will route data to the secondary WARN processor 604b via the communication links 112 and 116, respectively. Thus, the redundant architecture of FIG. 6 allows system operation even in the event of partial system failure. Other fault tolerant or redundant configurations may be used with the system 600. For example, computer systems are often configured to implement a Virtual Router Redundancy Protocol (VRRP) to provide computer redundant configurations. The system 600 will operate satisfactorily using the configuration of FIG. 6, VRRP, or other known configurations. As described above, the system 600 may be implemented using a variety of computer architectures. In any of the configurations described above, the WARN processor 104, 604 operates to alleviate the workload of the position server 106, 606.

The WARN processor 104, 604 processes the data received from a WARN 26 and transmits the processed data to the position server 106, 606. In the case of multiple reference stations there are redundant and non-redundant raw data arriving from the WARN 26. The WARN processor 104, 604 analyzes the redundant data types, which may include ephemeris data and raw navigation data. Data from a minimum of 2 reference stations out of all of the reference stations (e.g., the reference stations 12-16) providing reference data is compared.

If the redundant data types are in agreement, the rest of the redundant data with the same time tag and data content will be ignored for transmission to the selected position server 106, 606. The number of sets of redundant data transmitted to the selected position server 106, 606 may depend on the reliability and bandwidth of the communication link 24, 624 and/or the communication link 108, 608. For example, using the configuration of FIG. 5, multiple sets of redundant data may be transmitted to the position server 106 via the communication link 24. However, in another implementation, the communication link 24 may be implemented as a relatively reliable TCP/IP connection. In this instance, only a single set of data may be transmitted to the position server 106. Thus, a variable number of sets of the same data will be sent to the selected position server 106 depending on the reliability and bandwidth of the communication link. The additional set(s) of redundant data are transmitted to the selected position server 106 to assure adequate data redundancy, while at the same time reducing the flooding of the selected position server with multiple redundant data. The WARN processor 104 transmits the reduced set of data to the selected position server 106 for further processing in a conventional manner that need not be described herein. The workload of the selected position server 106 is reduced because it need only deal with the reduced set of redundant data.

For a non-redundant data type, such as the reference receiver measurement packets, the data can be transmitted to the selected position server 106 along with the appropriate receiver identification data. For the non-redundant data types, the WARN processor 104 will calculate the differential corrections (i.e., Differential GPS (DGPS) data) and send corrected DGPS data to the selected position server 106. This preprocessing of non-redundant data also reduces the workload of the selected position server 106.

In addition to the elimination of redundant data and preprocessing of data, such as corrected DGPS data, the WARN processor 104 performs quality assurance analysis on measurement data received from the reference stations (e.g., the reference stations 12-16). The WARN processor 104 receives data from the various reference stations via the CC 20, as described above.

Figure 7:
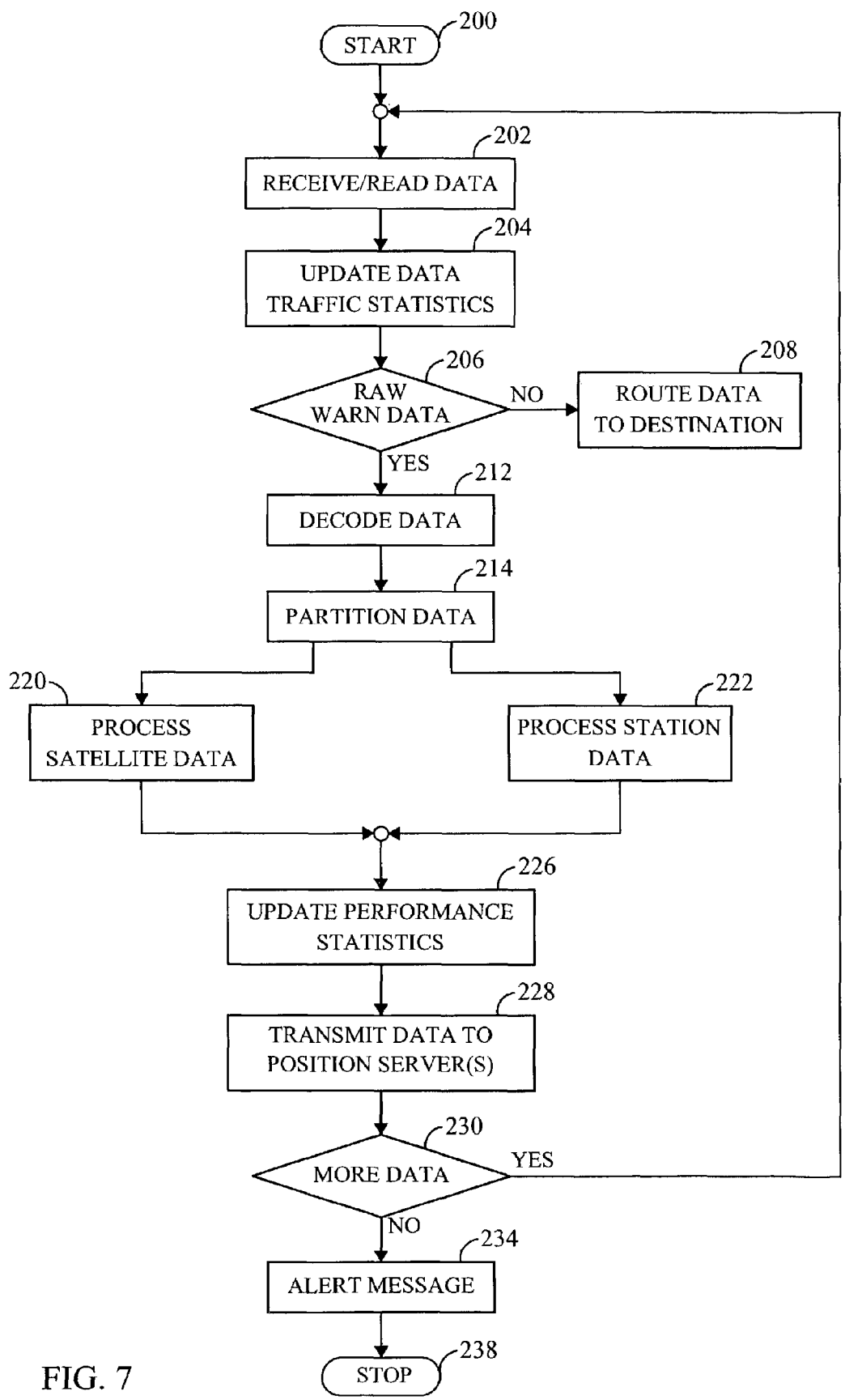
FIG. 7 is a flowchart illustrating one operational process.

The quality assurance (QA) processing is illustrated in the flowchart of FIG. 7 where at a start 200, lines of communication are established between the WARN 26 and the CC 20. In step 202, the WARN processor 104 receives and reads data from one or more of the reference stations. In an implementation wherein the communication link 24 is a WAN, this includes receiving data from the same IP multicast address via one of the routers (e.g., the router 102). The WARN processor 104 reads the data and parses the data in accordance with station identification, length, sequence number, and the like. As those skilled in the art will appreciate, data is typically transmitted as a plurality of data packets. The sequence number indicates the sequence number of individual data packets within an entire data message.

In step 204, the WARN processor 104 updates data traffic statistics. This includes an update of the number of bytes received from each of the reference 12-16, the total number of data packets that were received out of sequence, and/or missed data packets. Data traffic statistics may be used to determine the satisfactory operation of the reference stations themselves as well as communication links coupling the reference stations to the other components of the system 100.

In decision 206, the WARN processor 104 determines whether the data is raw WARN data (e.g., pseudorange data). If the data is not raw WARN data, the result of decision 206 is NO and, in step 208, the WARN processor routes the data to a destination. In some embodiments, such as the distributed architecture of FIGS. 3-5, one of the WARN processors 104 may have already processed data. A second WARN processor thus receives already processed data. For data of this type, the WARN processor 104 performs no additional data processing, but merely acts as a node in a data network and relays the data to the final destination. Typically, the final destination is the position server 106, but could be any other node on the network.

If the received data is raw WARN data, the result of decision 206 is YES. In that event, the WARN processor 104 decodes the data in step 212 and partitions the data in step 214. In step 212, the WARN processor decodes the raw data, (such as data received from a NovAtel reference receiver or other manufacturer's data) into an internal generic data format for navigation message data, measurement data, or other data packets. The reference station may also transmit almanac and/or ephemeris data to the WARN processor 104.

As part of the decoding process in step 212, the WARN processor 104 evaluates data integrity and determines whether data corruption has occurred. This may be done using conventional technology, such as a checksum, data error correction technology, or the like. Those skilled in the art will appreciate that data integrity may be determined by a variety of known techniques. Many data error detection and/or correction technique may be satisfactorily used with the system 100.

In step 214, the WARN processor 104 partitions the reference data into two groups. That is, the data is partitioned into station data, which may include pseudorange measurements, correction data, and the like. Data relating to the satellite is partitioned into a separate group. This includes data, such as navigation message, ephemeris data, almanac data, and the like.

In step 220, the WARN processor 104 processes the satellite data. This includes the process of updating satellite data counters, checking the satellite data against previously stored historic data, filling in data gaps, and the like. The WARN processor may also repair incoming data based on all data received from the satellites. For example, the WARN processor 104 may invert the navigation message polarity, if necessary, based on the receipt of all data from a particular satellite. If necessary, the WARN processor 104 may also reconstruct GPS system parameters, such as broadcast ionospheric model, UTC offset, health page parameters, almanac, ephemeris, and the like.

The WARN processor 104 also checks ephemeris data against explicit ephemeris data arriving from the reference stations. The WARN processor 104 periodically compares decoded system data from individual satellites to derive the best current common system parameters for transmission to the position server 106. Finally, the processed data is inserted into a satellite data buffer for subsequent transmission to the position server 106.

At the same time, the WARN processor 104 executes a different process, in step 222, to process station data. This includes updating station specific statistics, such as gaps in the data, out of order or missing data, and the like. The WARN processor 104 may also fill in gaps for existing data. Some commercial reference grade GPS receivers operate in dual-frequency mode. If dual-frequency measurements are available, the WARN processor 104 may measure for ionospheric delay for each satellite and/or combine measurements to form an ionospheric-free set of observables.

For station-specific data, if measurements are received, the DGPS corrections may be computed for each reference station. Those skilled in the art will recognize that the calculation of DGPS corrections require satellite orbit computations. When all data is available for a single epoch (e.g., every ten seconds), common network corrections and clock parameters are computed and individual station corrections are computed and checked against common network corrections. Any measurements that exceed a predetermined threshold are eliminated as unreliable. This process eliminates data that may be considered of questionable accuracy and thus improves the quality of data processing by the system 100. The processed data is inserted into a station data buffer for subsequent transmission to the position server 106.

Following the satellite data processing and station data processing in steps 220 and 222, respectively, the WARN processor 104 updates performance statistics in step 226. This includes update of performance statistics for both the received satellite and station data. The WARN processor may also encode and compress the best available data for transmission to the position server 106. As previously noted, in a distributed architecture, the system 100 may include a plurality of position servers 106, which may be connected to the same LAN, different LANs, and may be local or remote with respect to each other and with respect to the WARN processor 104.

In step 228, the WARN processor 104 transmits the data to one or more position servers 106. In a typical implementation of the system 100, the WARN processor 104 may transmit to the position server 106 station correction data or quality controlled and filtered measurements, network corrections, ionospheric model (either derived or broadcast), UTC time parameters, system health page, navigation message for individual satellites, almanac, ephemeris, and the like. Those skilled in the art will recognize that the WARN processor 104 may not transmit all the data listed above. In addition, the WARN processor 104 may transmit additional proprietary performance metrics, such as the number of reference stations tracking a single satellite, performance statistics of the WARN processor itself, the number of active reference stations, the number of bad measurements, and the like. This data may be used to determine the reliability of data from any given satellite, any given reference station, or various components of the system 100.

In decision 230, the system 100 determines whether additional data is available. If additional data is available, the result of decision 230 is YES, and the system returns to step 202 to process the additional data. If no additional data is available, the result of decision 230 is NO. In that event, in step 234 the WARN processor 104 transmits an alert message to indicate that no additional data is available and the process ends at 238. Thus, the WARN processor 104 provides preprocessing capabilities that improve the reliability of the data as well as reduce the burden otherwise placed on the PDE 22 (see FIG. 1).

In addition to the data processing described above, the WARN processor 104 generates status messages that may be transmitted to an administration client (not shown). Furthermore, the WARN processor 104 may generate statistics of the preprocessing to be transmitted to the administration client. Finally, the WARN processor 104 may also generate warning or error messages in the event that fatal errors or exceptions occur during the preprocessing operations.

The bandwidth for any one of the reference stations (e.g., the reference stations 12-16) to the CC 20 is preferably approximately 10-50 kilobits per second-Kbps. This bandwidth desired is based on the quantity of data generated by a reference station and the frequency with which that data is updated, so it can vary substantially between different implementations, depending upon such factors as the exact messages used, the number of satellites available, and the update rate of each message. It is desirable that the single reference receiver communication channel bandwidth is kept at the lower levels (10 kbps). The bandwidth from the CC 20 to the WARN processor 104 is variable. This bandwidth is based on the data provided by each of the reference stations (e.g., the reference stations 12-16) combined with additional data packet headers attached to each of the data packets attached by the CC 20. The bandwidth stated above is for a single reference station coupled to the communication manager gateway. If a plurality of reference stations are used, the bandwidth requirements increase proportionally. That is, the bandwidth is approximately N*10 Kbps, where N is the number of reference stations providing data to the CC 20.

The bandwidth from the WARN processor 104 to the position server 106 depends on the type of data sent and redundancy desired. This bandwidth is impacted by additional data headers that may be added to the processed data by the WARN processor 104. In a typical implementation, the filtered/processed data from the WARN processor 104 is expected to be less than 3*10 Kbps, which is much less than N*1.0 Kbps if all data is transmitted to the PDE 22 (See FIG. 1).

The system 100 has been described above in a number of varying implementations and architectures. It is to be understood that even though various embodiments and advantages have been set forth in the foregoing description, the above disclosure is illustrative only, and changes may be made in detail, yet remain within the broad principles of the disclosed method and apparatus. The present invention is to be limited only by the appended claims

What is claimed is:

1. An apparatus for processing reference data for wireless assisted positioning using data received from a plurality of reference data sources for subsequent processing by a position determining processor (PDP), comprising:

a communication controller to control communication with the reference data sources and to receive the reference data therefrom;

a first reference data processor communicatively coupled to the communication controller to receive the reference data therefrom; and a second reference data processor to process the reference data from the plurality of reference data sources, wherein the plurality of reference data sources are associated with a first network and the PDP is associated with a second network, with the first reference data processor being associated with the first network and the second reference data processor being associated with the second network, the first reference data processor functioning in a pass through mode to forward the reference data to the second reference data processor, and wherein the second reference data processor processes the reference data from the reference data sources by comparing raw data from at least two of the plurality of reference data sources to remove redundant reference data and thereby generate processed data, the second reference data processor communicating the processed data to the PDP.

2. The apparatus of claim 1 wherein the second reference data processor receives the reference data from the first network via a communication link coupling the first and second networks.

3. The apparatus of claim 1 wherein the PDP is implemented as a part of a computer system, the second reference data processor being a portion of the PDP computer system.

4. The apparatus of claim 1, wherein the first and second networks are coupled together by a wide area network (WAN).

5. The apparatus of claim 1 wherein the second reference data processor further analyzes the reference data to remove unreliable reference data received from the plurality of reference data sources, the processed data comprising data determined to be reliable.

6. The apparatus of claim 5 wherein the second reference data processor further analyzes the performance of the plurality of reference data sources based on reliability of reference data from the respective reference data sources.

7. The apparatus of claim 1, wherein the reference data comprises a sequence of data packets received by the communication controller, the second reference data processor analyzing the data packet sequence from at least a portion of the plurality of reference data sources to generate statistical data regarding the performance of the portion of reference data sources.

8. The apparatus of claim 7 wherein the statistical performance data is based at least in part on data related to out of sequence data packets, missing data packets, and missing data portions within the data packets.

9. An apparatus for processing reference data for wireless assisted positioning using data received from a plurality of reference data sources, the apparatus comprising:

a plurality of reference data processors to receive said reference data from a plurality of position location reference stations, said plurality of reference data processors collectively generating processed data from the received reference data, in part, by decoding raw data from the plurality of position location reference stations and comparing raw data from at least two of the plurality of position location reference stations by comparing a time tag and data content of the received reference data to determine a presence of redundant raw data and inhibiting transmission of redundant data;

said plurality of reference data processors being implemented in a distributed architecture to perform preprocessing of said reference data, workload being divided among said plurality of reference data processors; and a position determining processor (PDP) coupled to receive said processed data and configured to generate aiding information including at least one of ephemeris data or almanac data and forward the aiding information to a position determining entity.

10. The apparatus of claim 9, wherein the plurality of reference data sources are associated with a first network and the PDP is associated with a second network, the plurality of reference data processors being associated with the second network.

11. The apparatus of claim 10, wherein the plurality of reference data processors receive the reference data from the first network via a communication link coupling the first and second networks, the plurality of reference data processors communicating the processed data to the PDP via the second network.

12. The apparatus of claim 9, wherein the plurality of reference data sources are associated with a first network and the PDP is associated with a second network, the first and second networks being coupled together by a wide area network (WAN).

13. The apparatus of claim 9, further comprising a communication controller to control communication with the plurality of reference data sources and to receive the reference data therefrom, and configured to provide the reference data to the plurality of reference data processors.

14. The apparatus of claim 13, wherein the reference data comprises a sequence of data packets received by the communication controller, the plurality of reference data processors analyzing the data packet sequence from at least a portion of the plurality of reference data sources to generate statistical data regarding the performance of the portion of reference data sources.

15. The apparatus of claim 14 wherein the statistical performance data is based at least in part on data related to out of sequence data packets, missing data packets, and missing data portions within the data packets.

16. The apparatus of claim 9, wherein the plurality of reference data processors further analyze the reference data to remove unreliable reference data received from the plurality of reference data sources, the processed data comprising data determined to be reliable.

17. The apparatus of claim 16, wherein the plurality of reference data processors further analyze performance of the plurality of reference data sources based on reliability of reference data from the respective reference data sources.

* * * * *